March 27, 1951 G. E. DATH 2,546,217

FRICTION SHOCK ABSORBER FOR RAILWAY CAR TRUCKS

Filed April 26, 1949

Inventor:
George E. Dath.
By Henry Fuchs.
Atty.

Patented Mar. 27, 1951

2,546,217

UNITED STATES PATENT OFFICE 2,546,217

FRICTION SHOCK ABSORBER FOR RAILWAY CAR TRUCKS

George E. Dath, Mokena, Ill., assignor to W. H. Miner, Inc., Chicago, Ill., a corporation of Delaware Application April 26, 1949, Serial No. 89,785

5 Claims. (Cl. 267—9)

This invention relates to improvements in friction shock absorbers especially adapted for snubbing or dampening the action of truck springs of railway cars.

One object of the invention is to provide a friction shock absorber comprising a plurality of relatively movable friction members having inclined interengaging friction surfaces extending lengthwise thereof, and spring means yieldingly opposing relative movement of said members toward each other, wherein the spring means also yieldingly opposes relative lateral displacement of the friction elements with respect to each other, which relative displacement is due to the inclination of the friction surfaces, and the spring thus acts to press the friction surfaces of the friction members in tight frictional engagement with each other, and wherein the friction members are adjustably mounted with respect to each other to compensate for angular tilting of said friction members with respect to each other and thereby assure true flat contact between the friction surfaces thereof.

A more specific object of the invention is to provide a friction shock absorber, comprising follower members movable toward and away from each other, a coil spring bearing at opposite ends on said follower members, a pair of laterally spaced friction shoes carried by one of said followers, and an inclined friction member projecting from the other follower and slidingly engaged between said shoes, whereby, when said followers, inclined friction member and shoes are moved toward and away from each other, the follower having the friction member and the follower carrying the shoes are displaced laterally with respect to each other, thereby producing canting of the spring, which, due to its resistance to being canted, yieldingly forces the friction members into tight frictional engagement with each other, wherein the friction shoes are swiveled with respect to the follower member by which they are carried to compensate for relative tilting of the friction member and shoes, and following members by which they are carried, with respect to each other.

Other objects of the invention will more clearly appear from the description and claims hereinafter following.

Figure 1:
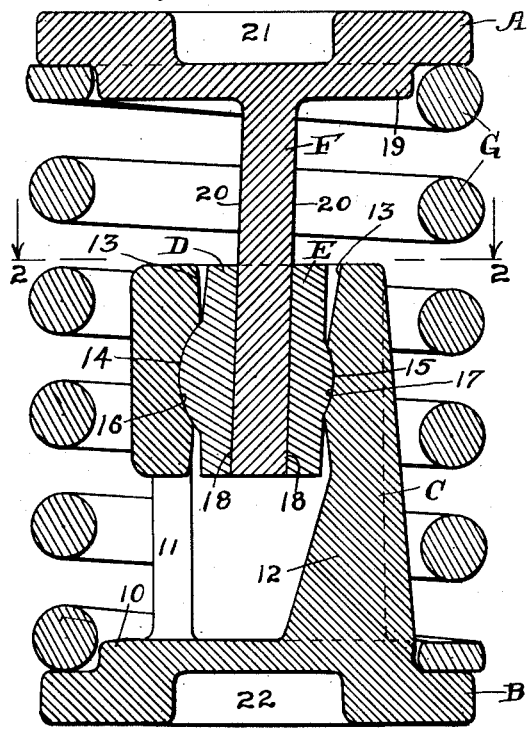
Figure 2:
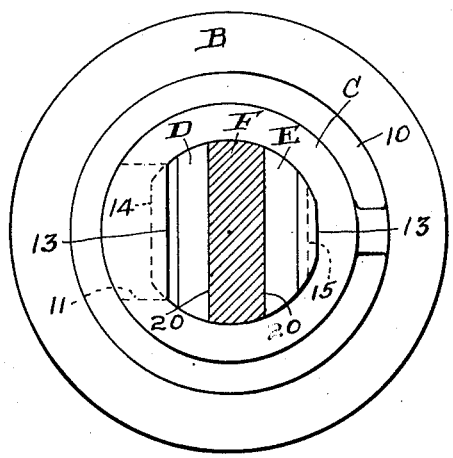
Figure 3:
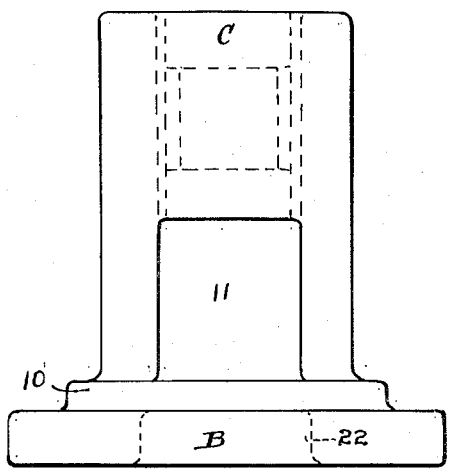
Figure 4:
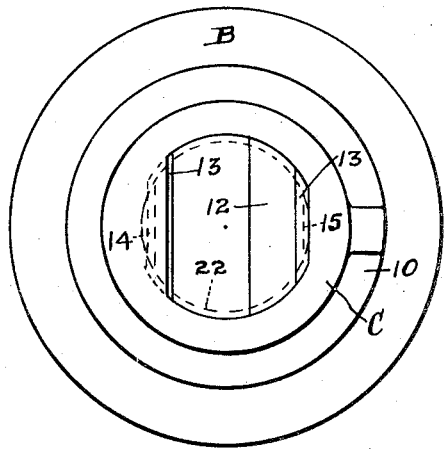

In the accompanying drawing forming a part of this specification, Figure 1 is a transverse, vertical sectional view of my improved shock absorber. Figure 2 is a horizontal sectional view, corresponding substantially to the line 2—2 of Figure 1. Figure 3 is a top plan view of the bottom follower and housing, shown in Figure 1. Figure 4 is a side elevational view of Figure 3, looking from left to right in said figure.

My improved shock absorber comprises broadly upper and lower followers A and B, a housing C on the lower follower, a pair of friction shoes D and E carried by the housing, an inclined friction plate F depending from the upper follower and engaged between the shoes D and E, and a coil spring G surrounding the friction plate and housing and bearing at its top and bottom ends on the upper and lower followers, respectively.

The lower follower B is in the form of a circular, disclike plate, having an upstanding, relatively shallow, cylindrical boss 10 thereon, which forms the base of the housing C. The housing C is in the form of a hollow cylinder upstanding from the follower B and formed integral with the boss 10 thereof. The side wall of the housing at the left hand side of the mechanism, as seen in Figure 1, has an opening 11 therethrough adjacent the base of said housing, and the opposite side wall portion, that is, the side wall at the right hand side of the same, as seen in Figure 1, is thickened at its base, as indicated at 12. At opposite sides of the housing, that is, at the left and right hand sides thereof, as seen in Figures 1 and 2, the interior walls are transversely flattened, as indicated at 13—13. The wall portions 13—13 are provided with inwardly opening, concave bearing seats 14 and 15, which extend vertically, the seat 14 being deeper than the seat 15.

The friction shoes D and E are in the form of flat, platelike blocks, mounted in the housing at opposite sides thereof, that is, at the left and right hand sides thereof, as seen in Figures 1 and 2. The shoe D is provided with a convex bearing projection 16 on its outer side, engaged in the seat 14, and the shoe E has a convex bearing projection 17 on its outer side engaged in the seat 15. The shoes are thus mounted for swiveling adjustment. Each of the shoes D and E has a lengthwise extending, flat friction surface 18 on its inner side, the friction surfaces 18—18 of the two shoes being opposed to each other.

The upper follower A is also in the form of a substantially circular, disclike plate having a depending, relatively shallow, cylindrical boss 19 thereon. The follower A corresponds in size to the follower B, and the boss 19 is of the same diameter as the boss 10.

The friction plate F depends from the follower A, being formed integral with the boss 19. The plate F is slidingly engaged between the shoes D and E and presents lengthwise extending, flat friction surfaces 20—20 on opposite sides thereof engaging with the surfaces 18—18 of the shoes. As clearly shown in Figure 1, the plate F is inclined to the vertical.

The spring G is in the form of a helical coil having its top and bottom ends bearing on the followers A and B, with the bosses 19 and 10 of said followers fitting within the upper and lower ends of said spring. The spring G, in addition to yieldingly opposing relative approach of the followers, opposes relative lateral displacement of said followers, due to its resistance to being canted.

The followers A and B are preferably provided with outwardly opening, central seats 21 and 22, adapted to accommodate the spring centering projections of the usual top and bottom spring follower plates of a truck spring cluster.

My improved shock absorber preferably replaces one or more of the spring units of a truck spring cluster, being interposed between the usual top and bottom spring plates which cooperate with said cluster.

The operation of my improved shock absorber is as follows: Upon the spring cluster of the truck of a railway car being compressed between the spring follower plates of the cluster, my improved shock absorber, which is disposed between said follower plates, is compressed therewith, thereby forcing the upper follower A and the friction plate F downwardly toward the lower follower B and the shoes D and E, against the resistance of the spring G. Due to the inclination of the friction plate F, this plate and the upper follower A are displaced to the left with respect to the lower follower B and the shoes D and E, as seen in Figure 1. Frictional resistance is thus provided between the friction plate F and the shoes D and E. The relative lateral displacement of the followers A and B is yieldingly opposed by the spring G, due to its tendency to resist canting action. Thus, during relative lengthwise movement of the parts, the required frictional resistance is developed to snub the action of the truck springs. Upon compression and expansion of the friction shock absorber, relative tilting of the followers, which frequently occurs in service, is compensated for by the swiveling action of the shoes D and E, thus assuring, at all times, true flat contact between the friction surfaces of the plate and shoes of the shock absorber.

I claim:

1. In a friction shock absorber, the combination with an end follower; of a second end follower, said followers being movable toward and away from each other lengthwise of the mechanism; a pair of laterally spaced friction shoes held against lengthwise movement with respect to said first named follower, said shoes being held against lateral separation, and being swiveled for swinging movement with respect to said follower; a friction plate movable with the other follower and having a sliding fit between said shoes, said plate being inclined with respect to the longitudinal axis of the mechanism; and spring means interposed between and engaged with said followers for yieldingly opposing longitudinal movement of said followers toward each other and lateral displacement of said followers with respect to each other.

2. In a friction shock absorber, the combination with an end follower; of a second end follower, said followers being movable toward and away from each other lengthwise of the mechanism; a pair of laterally spaced friction shoes held against lengthwise movement with respect to said first named follower, said shoes being held against lateral separation, and being swiveled for swinging movement with respect to said follower; a friction plate movable with the other follower and having a sliding fit between said shoes, said plate being inclined with respect to the longitudinal axis of the mechanism; and a coil spring bearing at opposite ends on said followers and having shouldered engagement with said followers to yieldingly oppose lateral displacement of said followers with respect to each other.

3. In a friction shock absorber, the combination with an end follower; of a second end follower, said followers being movable toward and away from each other lengthwise of the mechanism; a pair of laterally spaced friction shoes held against lengthwise movement with respect to said first named follower, said shoes being held against lateral separation, and being swiveled for swinging movement with respect to said follower; a friction plate movable with the other follower and having a sliding fit between said shoes, said plate being inclined with respect to the longitudinal axis of the mechanism; a helical coil spring having its opposite ends bearing on said followers; and centering projections on said followers, respectively engaged in opposite ends of said coil spring and closely fitting the interior of said spring.

4. In a friction shock absorber, the combination with an end follower; of a second end follower, said followers being movable toward and away from each other lengthwise of the mechanism; a housing on said first named follower; a laterally spaced pair of friction shoes interiorly of the housing at opposite sides thereof, said shoes having lengthwise extending friction surfaces on their inner sides and having rocking bearing engagement with said housing on their outer sides; a movable friction plate fixed with respect to said second named follower and extending toward said first named follower, said plate slidingly fitting between said shoes, and having friction surfaces on opposite sides thereof engaging the friction surfaces of said shoes, said plate being inclined with respect to the longitudinal axis of the mechanism; and spring means between and engaged with said followers opposing longitudinal movement of said followers toward each other and lateral displacement of said followers with respect to each other.

5. In a friction shock absorber, the combination with an end follower; of a second end follower, said followers being movable toward and away from each other lengthwise of the mechanism; a housing on said first named follower; a laterally spaced pair of friction shoes interiorly of the housing at opposite sides thereof, said shoes having lengthwise extending friction surfaces on their inner sides and having rocking bearing engagement with said housing on their outer sides; a movable friction plate fixed with respect to said second named follower and extending toward said first named follower, said plate slidingly fitting between said shoes, and having friction surfaces on opposite sides thereof engaging the friction surfaces of said shoes, said plate being inclined with respect to the longitudinal axis of the mechanism; a coil spring bearing at opposite ends on said followers; and spring centering bosses on said followers fitting within opposite ends of said coil spring.

GEORGE E. DATH.

REFERENCES CITED

The following references are of record in the file of this patent:

UNITED STATES PATENTS

| Number | Name | Date |
| --- | --- | --- |
| 207,020 | Dick et al. | Aug. 13, 1878 |
| 1,442,893 | Lewis | Jan. 23, 1923 |
| 2,426,684 | Haseltine | Sept. 2, 1947 |
| 2,444,337 | Cottrell | June 29, 1948 |